United States Patent
Hayase (10) Patent No.: US 10,950,881 B2
(45) Date of Patent: Mar. 16, 2021

(54) FUEL CELL SYSTEM

(71) Applicant: TOYOTA JIDOSHA KABUSHIKI KAISHA, Toyota (JP)

(72) Inventor: Yuichiro Hayase, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/426,834

(22) Filed: May 30, 2019

(65) Prior Publication Data
US 2019/0372140 A1 Dec. 5, 2019

(30) Foreign Application Priority Data
Jun. 5, 2018 (JP) ............................. JP2018-107434

(51) Int. Cl.
| H01M 8/04746 | (2016.01) |
| H01M 8/04089 | (2016.01) |
| H01M 8/24 | (2016.01) |
| H01M 8/0438 | (2016.01) |

(52) U.S. Cl.
CPC ..... H01M 8/04761 (2013.01); H01M 8/0441 (2013.01); H01M 8/04089 (2013.01); H01M 8/24 (2013.01)

(58) Field of Classification Search
None
See application file for complete search history.

(56) References Cited

U.S. PATENT DOCUMENTS

| 2004/0166387 A1* | 8/2004 | Imamura ............. H01M 8/0494 429/431 |
| 2005/0095488 A1 | 5/2005 | Formanski et al. |
| 2017/0317364 A1* | 11/2017 | Lucas ............... H01M 8/04201 |

FOREIGN PATENT DOCUMENTS

| JP | 2005-135910 A | 5/2005 |
| JP | 2013-015034 A | 1/2013 |

* cited by examiner

*Primary Examiner* — Carmen V Lyles-Irving
(74) *Attorney, Agent, or Firm* — Sughrue Mion, PLLC (57) ABSTRACT

A controller of a fuel cell system executes at least one of a first control and a second control. The first control is executed when a value of current is raised in association with an increase in flow rate ratio of cathode exhaust gas flowing into a bypass, the first control is executed by which the value of the current is raised to boost discharge pressure from a compressor and subsequently, an opening degree of a flow dividing valve is changed so as to increase the flow rate ratio of the cathode exhaust gas flowing into the bypass. The second control is executed when the value of the current is lowered in association with a reduction in the flow rate ratio of the cathode exhaust gas flowing into the bypass, the second control is executed by which the opening degree of the flow dividing valve is changed so as to reduce the flow rate ratio of the cathode exhaust gas flowing into the bypass and subsequently, the value of the current is lowered so as to lower the discharge pressure from the compressor.

4 Claims, 10 Drawing Sheets

FUEL CELL SYSTEM

CROSS REFERENCE TO RELATED APPLICATIONS

The present application claims priority to Japanese Patent Application No. 2018-107434, filed on Jun. 5, 2018, the contents of which are incorporated herein by reference in their entirety.

BACKGROUND

Field

The present disclosure relates to technology of a fuel cell system.

Related Art

According to conventional technology of a fuel cell system, a compressor is disposed on an oxidizing gas supply path and a turbine, i.e., an expander, is disposed on a discharge path of cathode exhaust gas (see JP 2005-135910A). In the conventional technology, the turbine includes a waste gate bypass. Power recovered by the turbine is used to drive the compressor to discharge cathode gas.

When the fuel cell system includes the turbine disposed on the discharge path of the cathode exhaust gas, the turbine is flow path resistance. Therefore, it is necessary to discharge the cathode gas to a fuel cell stack with higher discharge pressure than the flow path resistance on a side of the turbine. The flow path resistance on the side of the turbine varies depending on a flow rate of the cathode exhaust gas flowing into the turbine. When the cathode exhaust gas is sent to the waste gate bypass from a turbine inlet to a turbine outlet, cathode gas pressure in the fuel cell stack may drop sharply. In the case where the cathode gas pressure in the fuel cell stack drops sharply below the cathode gas pressure needed to obtain a required power generation amount, the required power generation amount may not be met and driving performance of a fuel cell vehicle may be degraded.

SUMMARY

According to one aspect of the present disclosure, a fuel cell system is provided. This fuel cell system comprises a fuel cell stack, a supply path through which cathode gas to be supplied to the fuel cell stack flows, a discharge path which is disposed downstream of the fuel cell stack and through which cathode exhaust gas flows, a compressor disposed on the supply path and driven by a motor, a turbine disposed on the discharge path, connected to the compressor, and driven by the cathode exhaust gas, a bypass which is branched off from the discharge path at an upstream side of the turbine and through which the cathode exhaust gas is discharged without passing through the turbine, a flow dividing valve an opening degree of which is adjusted so as to adjust flow rate ratio of the cathode exhaust gas flowing into the turbine and flow rate ratio of the cathode exhaust gas flowing into the bypass, and a controller configured to control operation of the fuel cell system. The controller executes at least one of a first control and a second control. The first control is executed when a value of current to be supplied to the motor is raised in association with an increase in the flow rate ratio of the cathode exhaust gas flowing into the bypass, the first control is executed by which the value of the current is raised to boost discharge pressure from the compressor and subsequently, the opening degree of the flow dividing valve is changed so as to increase the flow rate ratio of the cathode exhaust gas flowing into the bypass. The second control is executed when the value of the current is lowered in association with a reduction in the flow rate ratio of the cathode exhaust gas flowing into the bypass, the second control is executed by which the opening degree of the flow dividing valve is changed so as to reduce the flow rate ratio of the cathode exhaust gas flowing into the bypass and subsequently, the value of the current is lowered so as to lower the discharge pressure from the compressor.

The present disclosure can be implemented in various aspects, in addition to the aforementioned aspects, such as a method for controlling the fuel cell system and a vehicle equipped with the fuel cell system.

DETAILED DESCRIPTION

A. First Embodiment

Figure 1:
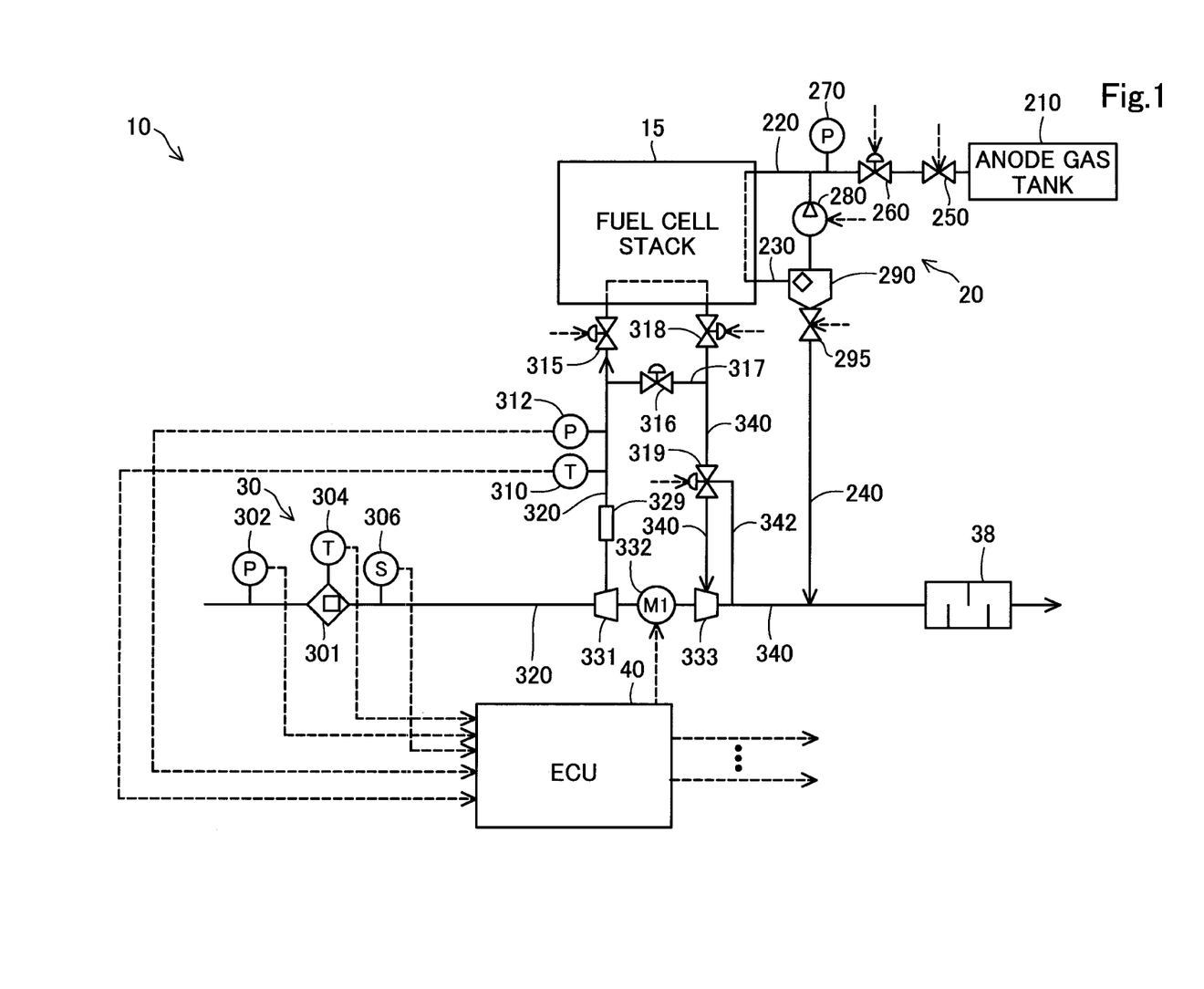
FIG. 1 is a schematic diagram illustrating a fuel cell system in a first embodiment of the present disclosure.

FIG. 1 is a schematic diagram illustrating a fuel cell system 10 in a first embodiment of the present disclosure. The fuel cell system 10 includes a fuel cell stack 15, an anode gas supply-discharge system 20, a cathode gas supply-discharge system 30 and an ECU 40 serving as a controller. The ECU 40 controls operations of the fuel cell system 10. The fuel cell stack 15 generates electric power through a chemical reaction between anode gas and cathode gas. The fuel cell system 10 is installed in a vehicle as a power source.

The anode gas supply-discharge system 20 includes an anode gas tank 210, an anode gas supply path 220, an anode gas circulation path 230, a main stop valve 250, a pressure control valve 260, a pressure sensor 270, a circulation pump 280, a gas-liquid separator 290, a gas-liquid discharge valve 295 and a gas-liquid discharge path 240.

The anode gas tank 210 stores high pressure hydrogen gas, for example. The anode gas tank 210 is connected to the fuel cell stack 15 by the anode gas supply path 220. The anode gas supply path 220 is provided with the main stop valve 250, the pressure control valve 260, and the pressure sensor 270 in this order from a side of the anode gas tank 210. The main stop valve 250 enables or disables supply of the anode gas from the anode gas tank 210 in accordance with instructions from the ECU 40. The pressure control valve 260 controls pressure of the anode gas to be supplied to the fuel cell stack 15 in accordance with instructions from the ECU 40. The pressure sensor 270 detects the pressure of the anode gas to be supplied to the fuel cell stack 15. A detection result by the pressure sensor 270 is transmitted to the ECU 40.

The anode gas circulation path 230 is connected to the fuel cell stack 15 and the anode gas supply path 220 so that anode exhaust gas discharged from the fuel cell stack 15 can circulate in the anode gas supply path 220. The anode gas circulation path 230 is provided with the gas-liquid separator 290 and the circulation pump 280 controlled by the ECU 40. The gas-liquid separator 290 separates liquid from the anode exhaust gas which is discharged from the fuel cell stack 15 and which is a mixture of gas and liquid. Moreover, impurity gas such as nitrogen gas in the anode exhaust gas is separated together with the liquid. The anode exhaust gas including unused hydrogen gas is circulated in the anode gas supply path 220 by the circulation pump 280. The gas-liquid discharge valve 295 transitions to an open state at a predetermined timing in accordance with an instruction from the ECU 40. As a result, the separated liquid and nitrogen gas pass through the gas-liquid discharge path 240 to be discharged from the system.

A cathode gas supply-discharge system 30 includes a cathode gas supply path 320, a cathode gas discharge path 340, a supply gas bypass 317, and a turbine bypass 342 as a bypass. The cathode gas supply-discharge system 30 provides air as the cathode gas through the cathode gas supply path 320 to the fuel cell stack 15 and discharges cathode exhaust gas, namely unused cathode gas, discharged from the fuel cell stack 15 to the outside of the system.

With regard to the cathode gas supply path 320, the cathode gas to be supplied to the fuel cell stack 15 flows through it. The cathode gas supply path 320 is provided with an air cleaner 301, an atmospheric pressure sensor 302, an outer temperature sensor 304, an air flow meter 306, a compressor 331, an intercooler 329, a supply gas temperature sensor 310, a supply gas pressure sensor 312 and an inlet-side pressure control valve 315. The air cleaner 301 removes dust when the cathode gas is taken in. The atmospheric pressure sensor 302 detects atmospheric pressure. The outer temperature sensor 304 detects temperature of the cathode gas before it is taken in. The air flow meter 306 detects an amount of the cathode gas that has been taken in. A detection result by each component 302, 304 and 306 is transmitted to the ECU 40. The compressor 331 includes a motor 332 and driving the motor 332 makes the compressor 331 discharge the cathode gas downstream. The motor 332 is controlled by the ECU 40 serving as the controller. The intercooler 329 cools the cathode gas discharged from the compressor 331. The supply gas temperature sensor 310 is disposed downstream of the compressor 331 and the intercooler 329 and detects temperature of the cathode gas to be supplied to the fuel cell stack 15. The supply gas pressure sensor 312 is disposed downstream of the compressor 331 and the intercooler 329 and detects pressure of the cathode gas to be supplied to the fuel cell stack 15. Detection results by the supply gas temperature sensor 310 and the supply gas pressure sensor 312 are transmitted to the ECU 40. As for the inlet-side pressure control valve 315, the ECU 40 controls its opening degree so as to control the pressure of the cathode gas to be supplied to the fuel cell stack 15.

The cathode gas discharge path 340 which is disposed downstream of the fuel cell stack 15 and through which the cathode exhaust gas flows. More specifically, the cathode exhaust gas discharged from the fuel cell stack 15 and the cathode exhaust gas coming through the supply gas bypass 317 flows through it. The cathode gas discharge path 340 is provided with an outlet-side pressure control valve 318, a flow dividing valve 319, and a turbine 333.

As for the outlet-side pressure control valve 318, the ECU 40 controls its opening degree so as to control the pressure of the cathode gas in the fuel cell stack 15. A downstream end of the gas-liquid discharge path 240 is connected to the cathode gas discharge path 340 on a downstream side of the turbine 333. In addition, a muffler 38 is disposed on the cathode gas discharge path 340 on a downstream side of a connection part of the gas-liquid discharge path 240. The muffler 38 reduces exhaust noise of the cathode exhaust gas.

With regard to the flow dividing valve 319, the ECU 40 controls its opening degree so as to control flow rate ratios of the cathode exhaust gas flowing into the turbine 333 and the turbine bypass 342. Accordingly, the flow dividing valve 319 is also called as a waste gate valve. In this embodiment, a poppet valve is used as the flow dividing valve 319. Generally speaking, when the opening degree of the poppet valve is changed by one step, a change rate of an effective sectional area of the turbine bypass 342 is relatively large. That is, a change in the opening degree of the poppet valve causes a significant change in the pressure on a cathode side of the fuel cell stack 15, which may disturb the stable power generation amount. The flow dividing valve 319 is disposed at a place where the turbine bypass 342 is connected to the cathode gas discharge path 340.

The turbine 333 is disposed downstream of the flow dividing valve 319. The turbine 333 is located on the same axis as that of the compressor 331 and connected to the compressor 331 via the motor 332. The turbine 333 is driven by the cathode exhaust gas. Power generated by revolution of the turbine 333 is used by the motor 332 as its auxiliary power.

The turbine bypass 342 branches off from the cathode gas discharge path 340 at an upstream side of the turbine 333. A downstream end of the turbine bypass 342 joins to the cathode gas discharge path 340 on a downstream side of the turbine 333. In other words, the turbine bypass 342 is a flow path through which the cathode exhaust gas is discharged without passing through the turbine 333.

With regard to the supply gas bypass 317, one end is connected to the cathode gas supply path 320 and the other end is connected to the cathode gas discharge path 340. The supply gas bypass 317 is a flow path which allows the cathode gas discharged toward the fuel cell stack 15 by the compressor 331 to flow to the cathode gas discharge path 340 without passing through the fuel cell stack 15. The supply gas bypass 317 is provided with a bypass pressure control valve 316. The ECU 40 controls an opening degree of the bypass pressure control valve 316 so as to control an amount of the cathode gas flowing into the supply gas bypass 317.

Figure 2:
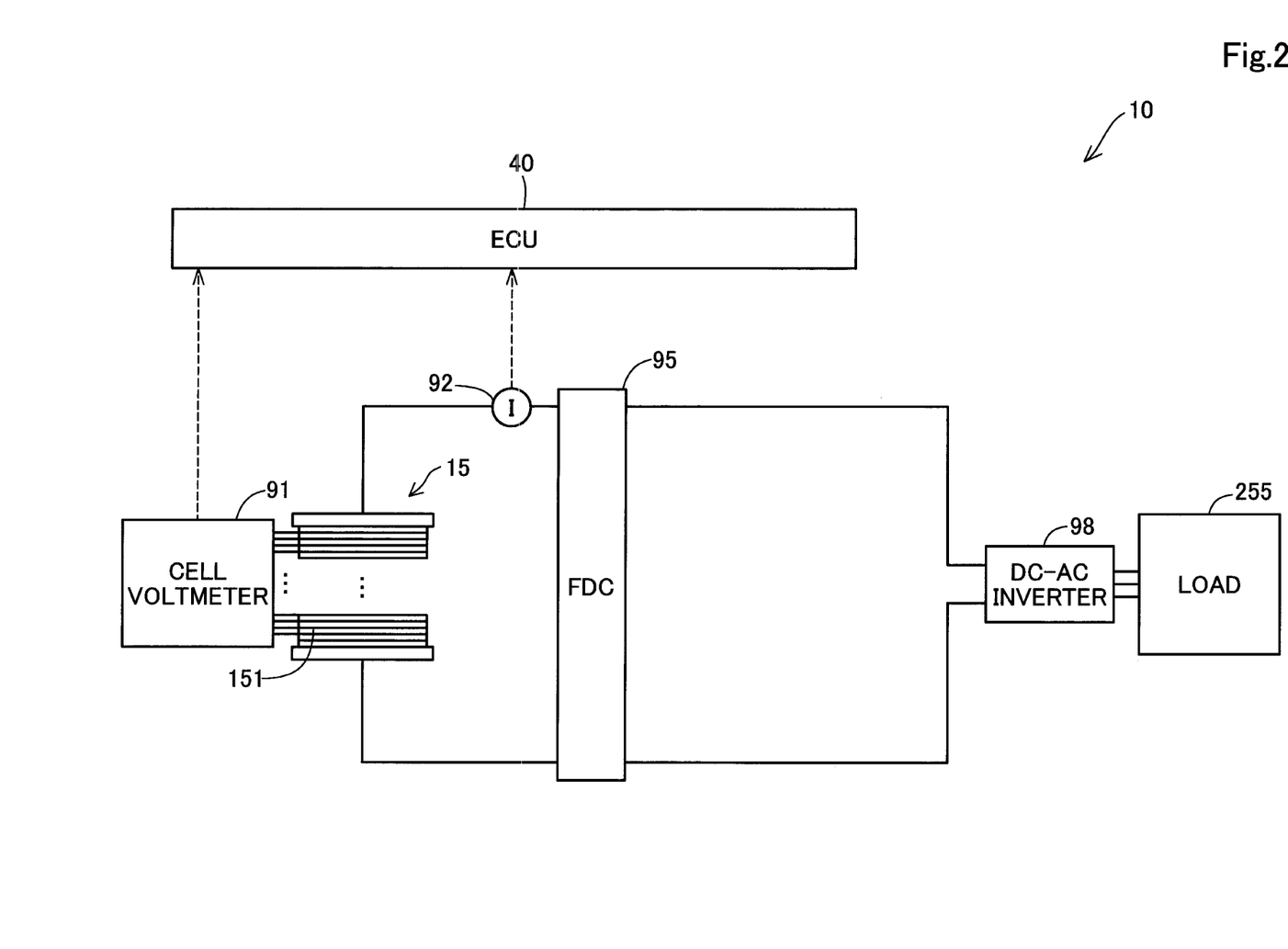
FIG. 2 is a conceptual diagram illustrating an electrical configuration of the fuel cell system.

FIG. 2 is a conceptual diagram illustrating an electrical configuration of the fuel cell system 10. The fuel cell system 10 includes an FDC 95, a DC-AC inverter 98, a cell voltmeter 91, and a current sensor 92.

The cell voltmeter 91 is connected to all unit cells 151 of the fuel cell stack 15 and measures a cell voltage of each unit cell 151. The cell voltmeter 91 transmits measurement results to the ECU 40. The current sensor 92 measures output current from the fuel cell stack 15 and transmit its value to the ECU 40.

The FDC 95 is a circuit configured as a DC-DC converter. The FDC 95 controls the output current from the fuel cell stack 15 based on a current instruction value from the ECU 40. The current instruction value is an objective value of the output current from the fuel cell stack 15 and is set by the ECU 40. The ECU 40 calculates a required current value using required electric energy from the fuel cell stack 15 so as to generate the current instruction value. For example, the ECU 40 determines the required electric energy based on an opening degree of an accelerator of a fuel cell vehicle.

The FDC 95 functions as an input voltmeter and an impedance meter. More specifically, the FDC 95 measures input voltage and transmit its value to the ECU 40. The FDC 95 measures impedance of the fuel cell stack 15 by an alternating current impedance method. A frequency of the impedance used in this embodiment includes a high frequency, more particularly, a frequency from 100 Hz to 1 kHz. The FDC 95 boosts up the input voltage and supplies it to the DC-AC inverter 98.

The DC-AC inverter 98 is connected to the fuel cell stack 15 and a load 255. The DC-AC inverter 98 converts direct current output from the fuel cell stack 15 into alternating current and supplies it to the load 255.

Figure 3:
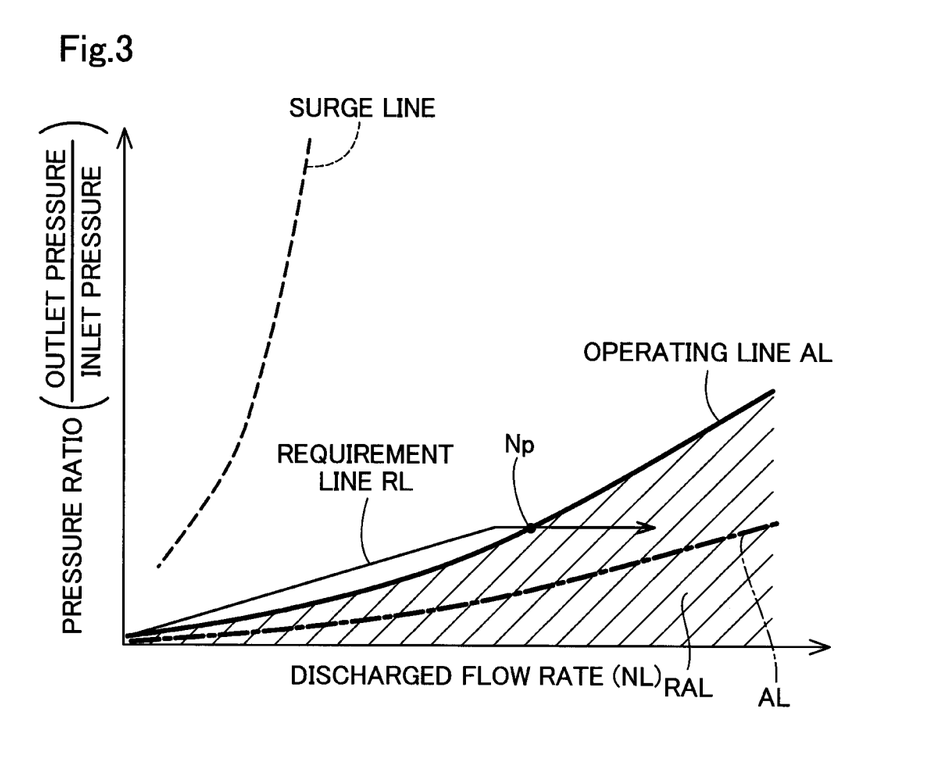
FIG. 3 is a graph illustrating performance characteristics of a compressor.

FIG. 3 is a graph illustrating performance characteristics of the compressor 331. In FIG. 3, a vertical axis represents a pressure ratio, i.e., outlet pressure/inlet pressure, of the compressor 331 while a horizontal axis represents a discharged flow rate from the compressor 331. An operation point of the compressor 331 is defined by a combination of the pressure ratio and the discharged flow rate. A surge line is a boundary line over which surging occurs in the compressor 331. For example, when the pressure ratio rises so high as to exceed the surge line, the surging occurs in the compressor 331. An operating line AL in FIG. 3 represents an operational limit of the compressor 331 when the flow dividing valve 319 is fully closed and all the cathode exhaust gas flows into the turbine 333. That is, in an inoperable range RAL where the pressure ratio is lower than the operating line AL, i.e., the range RAL shown by single hatching, the flow path resistance in the turbine 333 rises so high that the compressor 331 cannot effectively discharge the cathode gas. Therefore, before the operation point of the compressor 331 reaches the operating line AL, the ECU 40 controls the opening degree of the flow dividing valve 319 to let at least part of the cathode exhaust gas flow in the turbine bypass 342. As a result, when the cathode exhaust gas is made to flow into the turbine bypass 342, the operating line AL, as shown by a dash-dot line, is shifted below the operating line AL in FIG. 3.

A requirement line RL shown in FIG. 3 is a line connecting the operation points of the compressor 331 in time series. The operation points are calculated by the ECU 40 based on a required power generation amount from the fuel cell stack 15. The requirement line RL shown in FIG. 3 represents, for example, a case where the ECU 40 receives an acceleration requirement from a vehicle equipped with the fuel cell system 10. In this case, before the operation point reaches an operation point Np on the requirement line RL where the requirement line RL and the operating line AL intersect with each other, the ECU 40 controls the flow dividing valve 319 to let part of the cathode exhaust gas flow in the turbine bypass 342.

Figure 4:
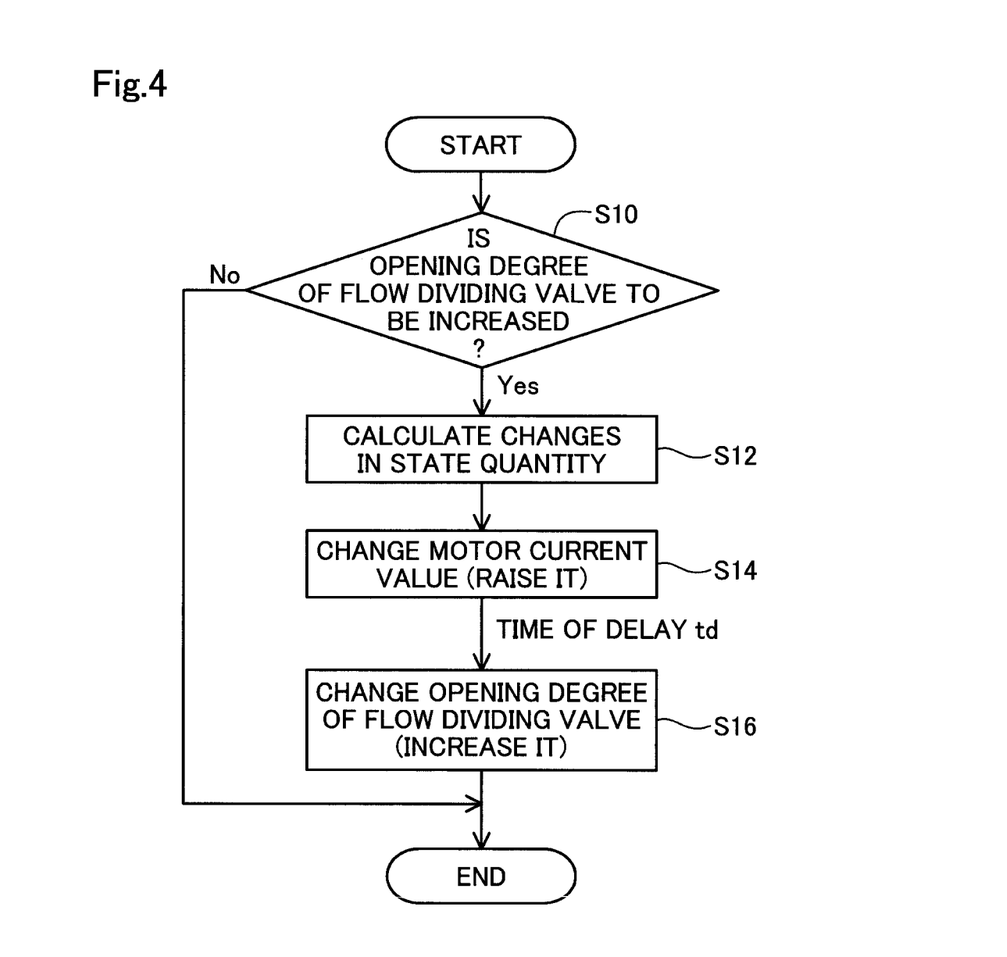
FIG. 4 is a first flowchart executed by an ECU.

FIG. 4 is a first flowchart executed by the ECU 40. The ECU 40 repeatedly executes processing shown in the first flowchart at predetermined intervals in addition to ordinary processing for controlling the fuel cell system 10 such as supply amount control of the anode gas. Described hereinafter is an example of processing executed by the ECU 40 for increasing the opening degree of the flow dividing valve 319 up to a predetermined value from a zero opening degree, i.e., a fully closed state in which all the cathode exhaust gas flows in the turbine 333.

First of all, the ECU 40 compares the present operation point on the requirement line RL and the operating line AL so as to determine whether the opening degree of the flow dividing valve 319 is to be increased (step S10). For example, in the case where the operation point reaches or exceeds the operating line AL upon proceeding to the next point, the ECU 40 determines that the opening degree of the flow dividing valve 319 is to be increased.

If the determination of the step S10 is "No", this routine ends. On the other hand, if the determination of the step S10 is "Yes", the ECU 40 calculates changes in state quantity before and after the change in the opening degree of the flow dividing valve 319 (step S12). The state quantity includes the opening degree of the flow dividing valve 319 after the change, a change amount of the pressure on the outlet side of the compressor 331, also referred to as "pressure change amount", a change amount of a work amount of the compressor 331 due to the change in the pressure, and a change amount of a current value of the motor 332.

The opening degree of the flow dividing valve 319 after the change is calculated using an opening degree map defining a relation between the pressure detected by the supply gas pressure sensor 312 and the opening degree of the flow dividing valve 319.

The pressure change amount is calculated using an opening degree pressure map defining a relation between the opening degree of the flow dividing valve 319 and the pressure change amount. The change amount of the work amount is calculated by mathematical expressions (1) to (4) described below:

[Math 1]

[Math. 1]

$$(Lc)ad = Cpa \times Ga \times T1 \times \left\{(P3/P1)^{\frac{K}{K-1}} - 1\right\} \tag{1}$$

In this mathematical expression, (Lc)ad represents heat insulating work of the compressor 331, Cpa represents specific heat at constant pressure, K represents ratio of specific heat, Ga represents mass flow rate flowing into the compressor 331, T1 represents inlet temperature of the compressor 331, P1 represents inlet pressure of the compressor 331, and P3 represents outlet pressure of the compressor 331.

The mass flow rate Ga is a detection value by the air flow meter 306, the inlet temperature T1 is a detection value by the outer temperature sensor 304, the inlet pressure P1 is a detection value by the atmospheric pressure sensor 302, and the outlet pressure P3 is a detection value by the supply gas pressure sensor 312.

[Math 2]

[Math. 2]

$$Wx = \frac{Cpa \times Ga \times T1 \times \left\{(P3/P1)^{\frac{K}{K-1}} - 1\right\}}{\eta cx} \tag{2}$$

In this mathematical expression, Wx represents required work of the compressor 331 before the change, and ηcx represents efficiency of the compressor 331 before the change. The efficiency of the compressor 331 is calculated using a predefined map.

[Math 3]

[Math. 3]

$$Wy = \frac{Cpa \times Ga \times T1 \times \left\{(P3/P1)^{\frac{K}{K-1}} - 1\right\}}{\eta cy} \quad (3)$$

In this mathematical expression, Wy represents required work of the compressor 331 after the change, and ηcy represents efficiency of the compressor 331 after the change.

[Math 4]

[Math. 4]

$$Lc = Wy - Wx \quad (4)$$

In this mathematical expression, Lc represents a change amount of a work amount.

The change amount Lc in the forgoing mathematical expression (4) represents a work amount, i.e., additional work, of the compressor 331 that is required due to a reduction in the outlet pressure of the compressor 331 in the case where the opening degree of the flow dividing valve 319 is increased so as to reduce the outlet pressure of the compressor 331.

The ECU 40 calculates the change amount of the current value of the motor 332 by mathematical expressions (5) to (7) described below:

[Math 5]

[Math. 5]

$$MW = T \times Nt \quad (5)$$

In this mathematical expression, MW represents output (W) of the motor 332, T represents torque of the motor 332, and Nt represents rotational speed of the motor 332.

[Math 6]

[Math. 6]

$$T = Kt \times Ia \quad (6)$$

In this mathematical expression, Kt represents a torque constant, and Ia represents a motor current value.

[Math 7]

[Math. 7]

$$Lc = Kt \times \Delta Ia \times Nt \quad (7)$$

In this mathematical expression, Ma represents a change amount of the motor current value.

Next, the ECU 40 transmits an instruction to change the value of the current to be supplied to the motor 332, i.e., the motor current value, to a power supply circuit in the fuel cell system 10 so as to make the motor current value correspond to the current value of the motor 332 calculated in the step S12 (step S14). The instruction to change the motor current value is referred to as a current change instruction. Specifically, the transmitted instruction in the step S14 is to raise the motor current value. After transmitting the current change instruction, the ECU 40 waits for a predetermined time of delay td and transmits an opening degree change instruction to the flow dividing valve 319 so as to make the opening degree of the flow dividing valve 319 correspond to the opening degree calculated in the step S12 (step S16). Specifically, the ECU 40 increases the opening degree of the flow dividing valve 319 so as to increase the flow rate ratio of the cathode exhaust gas flowing into the turbine bypass 342 in the step S16. The time of delay td may be set for any time period as long as it can restrain the cathode gas pressure in the fuel cell stack 15 from excessively dropping below the objective cathode gas pressure as a result of the increase in the opening degree of the flow dividing valve 319. The time of delay td in this embodiment is 0.1 second.

Figure 5:
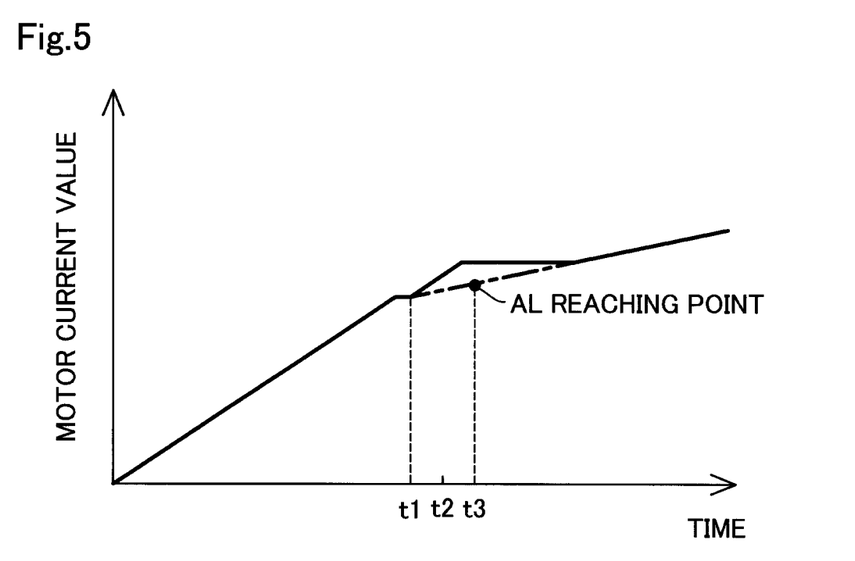
FIG. 5 is a graph illustrating motor current value when an opening degree of a flow dividing valve is changed.
Figure 6:
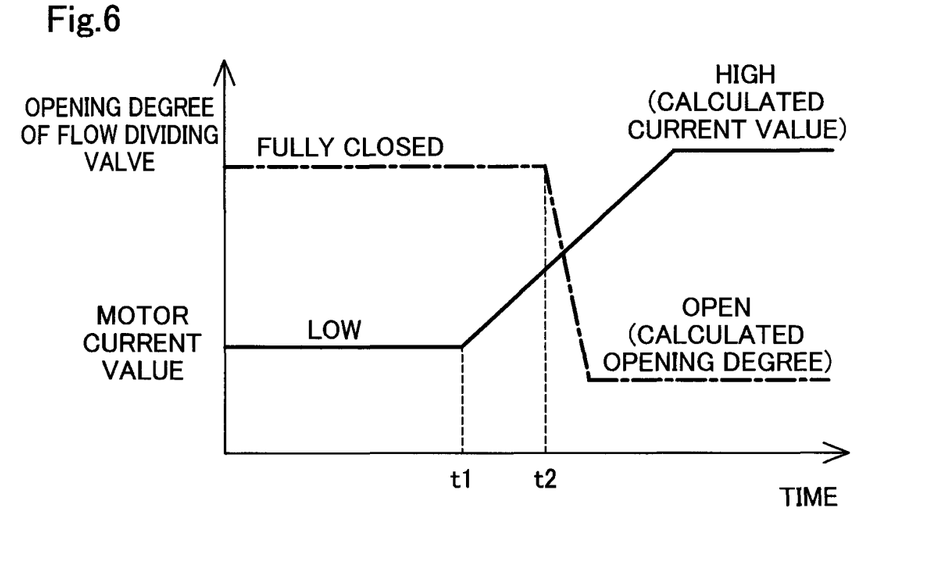
FIG. 6 is a graph conceptually illustrating a step S14 and a step S16 in FIG. 4.

FIG. 5 is a graph illustrating the value of the current to be supplied to the motor 332, i.e., the motor current value, when the opening degree of the flow dividing valve 319 is changed. FIG. 6 is a graph conceptually illustrating the steps S14 and S16 in FIG. 4.

For example, when receiving an acceleration requirement from the vehicle, the ECU 40 calculates the motor current value in advance based on the power generation amount from the fuel cell stack 15 determined from the acceleration requirement. The ECU 40 transmits an instruction to the power supply circuit to control the motor current value so as to make it correspond to the calculated motor current value. In this respect, when the ECU 40 raises the motor current value with the flow dividing valve 319 fully closed and the operation point of the compressor 331 reaches the operating line AL at time t3 shown in the FIG. 5, the ECU 40 executes processing described below. That is, the ECU 40 determines "Yes" in the step S10 at some time before the time t3 and calculates changes in the state quantity. Then, the ECU 40 transmits the current change instruction to the power supply circuit at time t1 as shown in FIGS. 5 and 6, and transmits the opening degree change instruction to the flow dividing valve 319 at time t2 after the time of delay td from the time t1. Note that a dash-dot line in the graph in FIG. 5 represents the motor current value when the opening degree of the flow dividing valve 319 is not changed, but kept constant.

Figure 7:
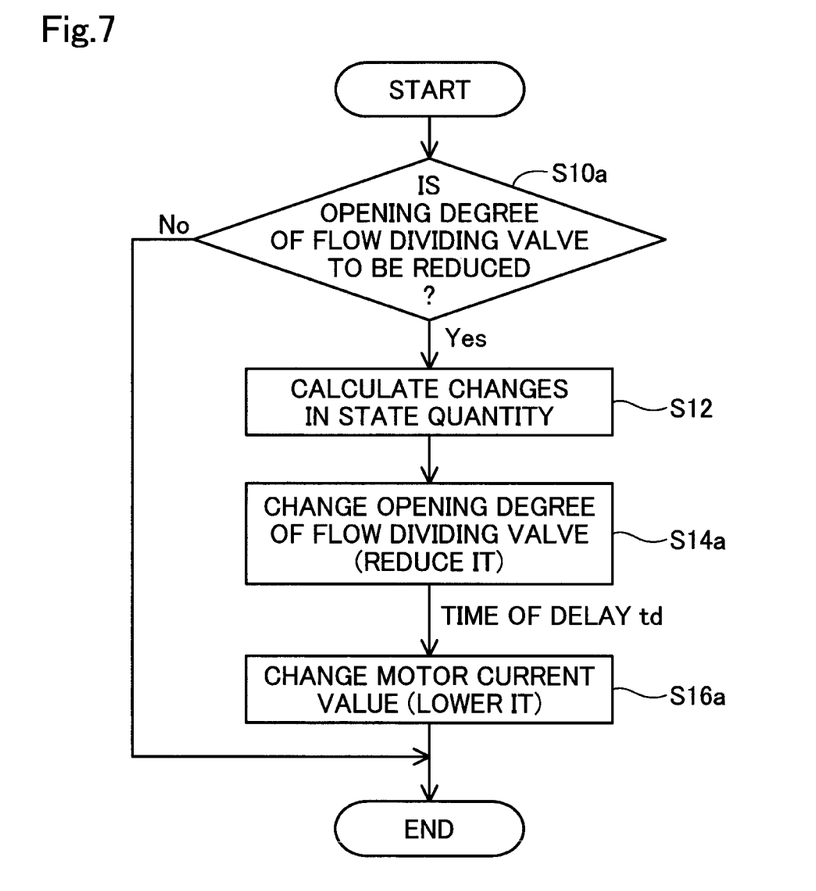
FIG. 7 is a second flowchart executed by the ECU.

FIG. 7 is a second flowchart executed by the ECU 40. The ECU 40 repeatedly executes the second flowchart at predetermined intervals. Described hereinafter is an example of processing executed by the ECU 40 for reducing the opening degree of the flow dividing valve 319 down to a predetermined value from a 100% opening degree, i.e., a fully open state in which all the cathode exhaust gas flows in the turbine bypass 342. Steps that are the same as those shown in FIG. 4 are denoted with the same reference numerals as those in FIG. 4 and the descriptions thereof will be omitted.

The ECU 40 compares the present operation point of the compressor 331 with the operating line AL so as to determine whether the opening degree of the flow dividing valve 319 is to be reduced (step S10a). For example, in the case where the required power generation amount is decreasing, thereby reducing the discharged flow rate from the compressor 331 and consequently reducing the flow rate of the cathode exhaust gas branched off into the turbine bypass 342, and the operation point still does not fall in the inoperable range RAL, the ECU 40 determines that the opening degree of the flow dividing valve 319 is to be reduced. The ECU 40 executes the step S12 after the step S10a. Then, the ECU 40 transmits the opening degree change instruction to the flow dividing valve 319 so as to make the opening degree of the flow dividing valve 319 correspond to the opening degree calculated in the step S12

(step S14a). More specifically, the ECU 40 reduces the opening degree of the flow dividing valve 319 so as to increase the flow rate ratio of the cathode exhaust gas flowing into the turbine 333 in the step S14a. After transmitting the opening degree change instruction, the ECU 40 waits for the predetermined time of delay td and transmits the current change instruction to the motor 332 so as to make the value of the current to be supplied to the motor 332 correspond to the current value calculated in the step S12 (step S16a). Specifically, the instruction in the step S16a is to lower the motor current value.

According to the aforementioned first embodiment, in the case where the motor current value is changed in association with the change in the opening degree of the flow dividing valve 319, the timing of the change in the opening degree of the flow dividing valve 319 and the timing of the change in the motor current value are shifted by the predetermined time of delay td. More specifically, the ECU 40 executes a first control described below, when the motor current value is raised in association with an increase in the flow rate ratio of the cathode exhaust gas flowing into the turbine bypass 342. That is to say, the ECU 40 executes the first control by which the motor current value is raised to boost discharge pressure from the compressor 331 and subsequently, the opening degree of the flow dividing valve 319 is changed so as to increase the flow rate ratio of the cathode exhaust gas flowing into the turbine bypass 342 (steps S14 and S16 in FIG. 4). As a result, sharp drop of the cathode gas pressure in the fuel cell stack 15 can be suppressed, and thus the power generation amount by the fuel cell stack 15 can be less likely to fall below the required power generation amount.

In addition, according to the aforementioned first embodiment, the ECU 40 executes a second control described below, when the motor current value is lowered in association with a reduction in the flow rate ratio of the cathode exhaust gas flowing into the turbine bypass 342. That is to say, the ECU 40 executes the second control by which the flow rate ratio of the cathode exhaust gas flowing into the turbine bypass 342 is reduced and subsequently, the value of the current to be supplied to the motor 332 is lowered so as to lower the discharge pressure from the compressor 331 (steps S14a and S16a in FIG. 7). As a result, since the cathode gas pressure in the fuel cell stack 15 is raised by the flow dividing valve 319 before the discharge pressure from the compressor 331 is lowered, the sharp drop of the pressure in the fuel cell stack 15 can be suppressed. As a result, the power generation amount by the fuel cell stack can be less likely to fall below the required power generation amount.

As described above, according to the first embodiment, the sharp drop of the cathode gas pressure in the fuel cell stack 15 can be suppressed without using a variable guide blade, and thus the power generation amount by the fuel cell stack 15 can be less likely to fall below the required power generation amount.

B. Second Embodiment

Figure 8:
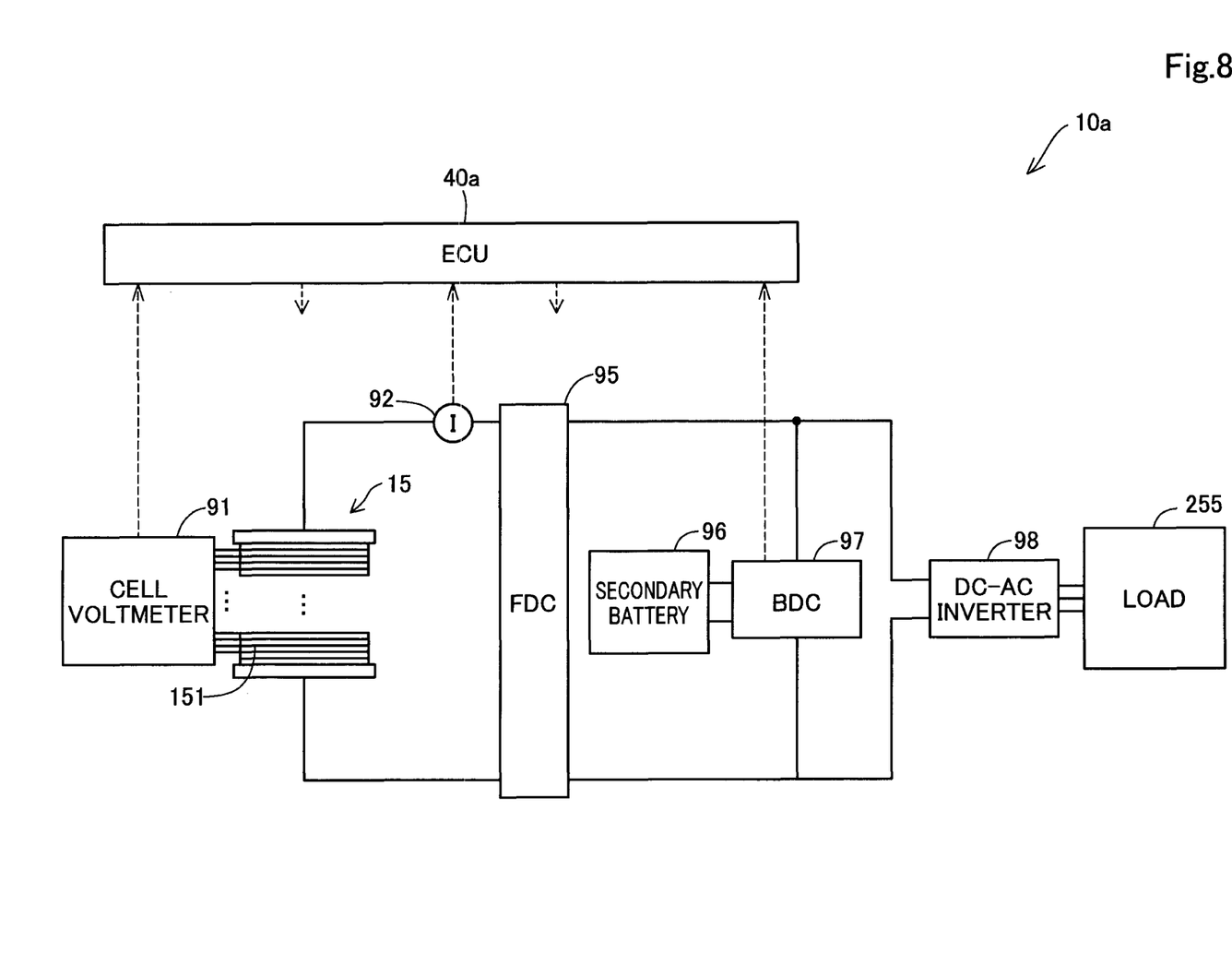
FIG. 8 is a conceptual diagram illustrating an electrical configuration of the fuel cell system in a second embodiment of the present disclosure.

FIG. 8 is a conceptual diagram illustrating an electrical configuration of a fuel cell system 10a in a second embodiment of the present disclosure. Differences from the fuel cell system 10 in the first embodiment shown in FIG. 2 are that the fuel cell system 10a in this embodiment includes a secondary battery 96 and a BDC 97. In the description below, elements that are the same as those in the first embodiment are denoted with the same reference numerals as in the first embodiment, and the description thereof will be omitted. Note that the fuel cell system 10a in the second embodiment includes the anode gas supply-discharge system 20 and the cathode gas supply-discharge system 30 as in the first embodiment.

The secondary battery 96 is formed from a lithium ion battery and works as an auxiliary power supply. Moreover, the secondary battery 96 supplies the fuel cell stack 15 with electric power and takes in electric power generated by the fuel cell stack 15 and regenerative electric power.

The BDC 97 is a circuit configured as a DC-DC converter together with the FDC 95 and controls charging and discharging of the secondary battery 96 in response to instructions from an ECU 40a serving as the controller. The BDC 97 measures SOC (State Of Charge), i.e., a remaining capacity, of the secondary battery 96 and transmits it to the ECU 40a.

Figure 9:
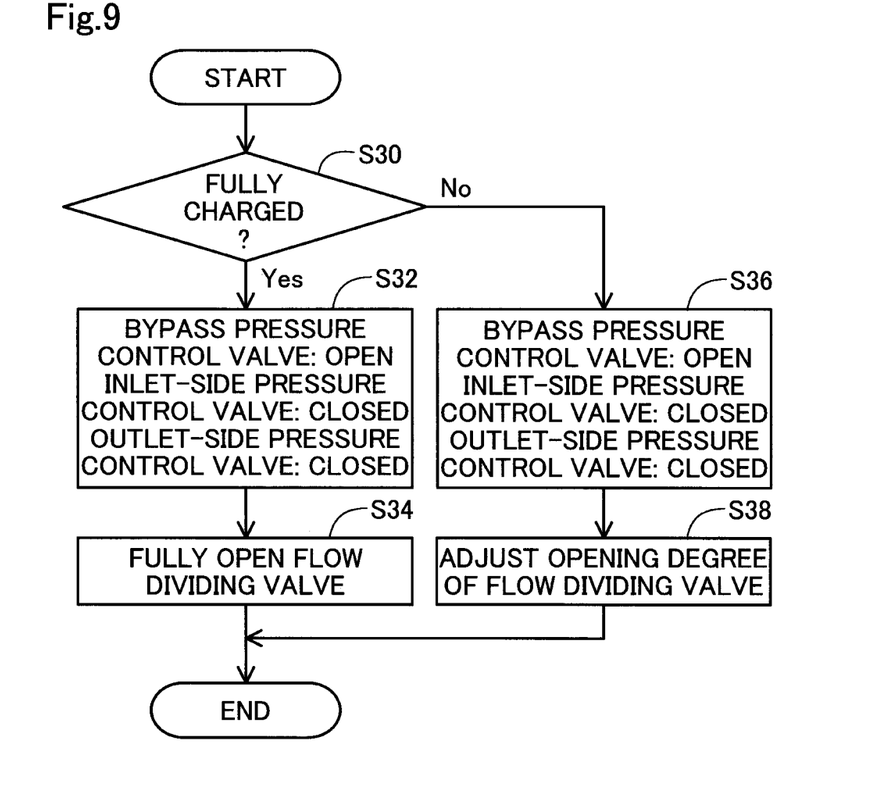
FIG. 9 is a flowchart executed by the ECU.

FIG. 9 is a flowchart executed by the ECU 40a. In addition to the flowcharts shown in FIGS. 4 and 7, the ECU 40a executes the flowchart shown in FIG. 9 as well. The flowchart shown in FIG. 9 is executed at predetermined intervals when it is required to consume the regenerative electric power generated by the load 255 in the case of the vehicle decelerating or the like.

First of all, the ECU 40a determines whether the secondary battery 96 is fully charged based on the remaining capacity of the secondary battery 96 measured by the BDC 97 (step S30). In the case where the secondary battery 96 is fully charged, the ECU 40a executes a step S32 and a step S34. In the step S32, the bypass pressure control valve 316 is fully open while the inlet-side pressure control valve 315 and the outlet-side pressure control valve 318 are fully closed. With this configuration, all of the cathode gas discharged from the compressor 331 flows into the cathode gas discharge path 340 via the supply gas bypass 317 without being supplied to the fuel cell stack 15. In the step S34, the flow dividing valve 319 is fully open, i.e., the opening degree is 100%, so that all the cathode gas in the supply gas bypass 317 will flow into the turbine bypass 342. The cathode gas in the supply gas bypass 317 is also referred to as "cathode exhaust gas". As a result, no cathode exhaust gas is supplied to a side of the turbine 333, which can increase the power consumption of the compressor 331. Consequently, an overcharge of the secondary battery 96 can be suppressed, and thus the secondary battery 96 can be less likely to deteriorate.

In the case where the secondary battery 96 is not fully charged, the ECU 40a executes a step S36 and a step S38. The step S36 is the same processing as that in the step S32. In the step S38, the ECU 40a adjusts the opening degree of the flow dividing valve 319 so as to avoid the operation of the compressor 331 in the inoperable range RAL.

The aforementioned second embodiment can provide the same advantageous effects as those of the first embodiment with respect to the same configuration as that of the first embodiment. For example, the sharp drop of the cathode gas pressure in the fuel cell stack 15 can be suppressed without using a variable guide blade, and thus the power generation amount by the fuel cell stack 15 can be less likely to fall below the required power generation amount.

C. Third Embodiment

Figure 10:
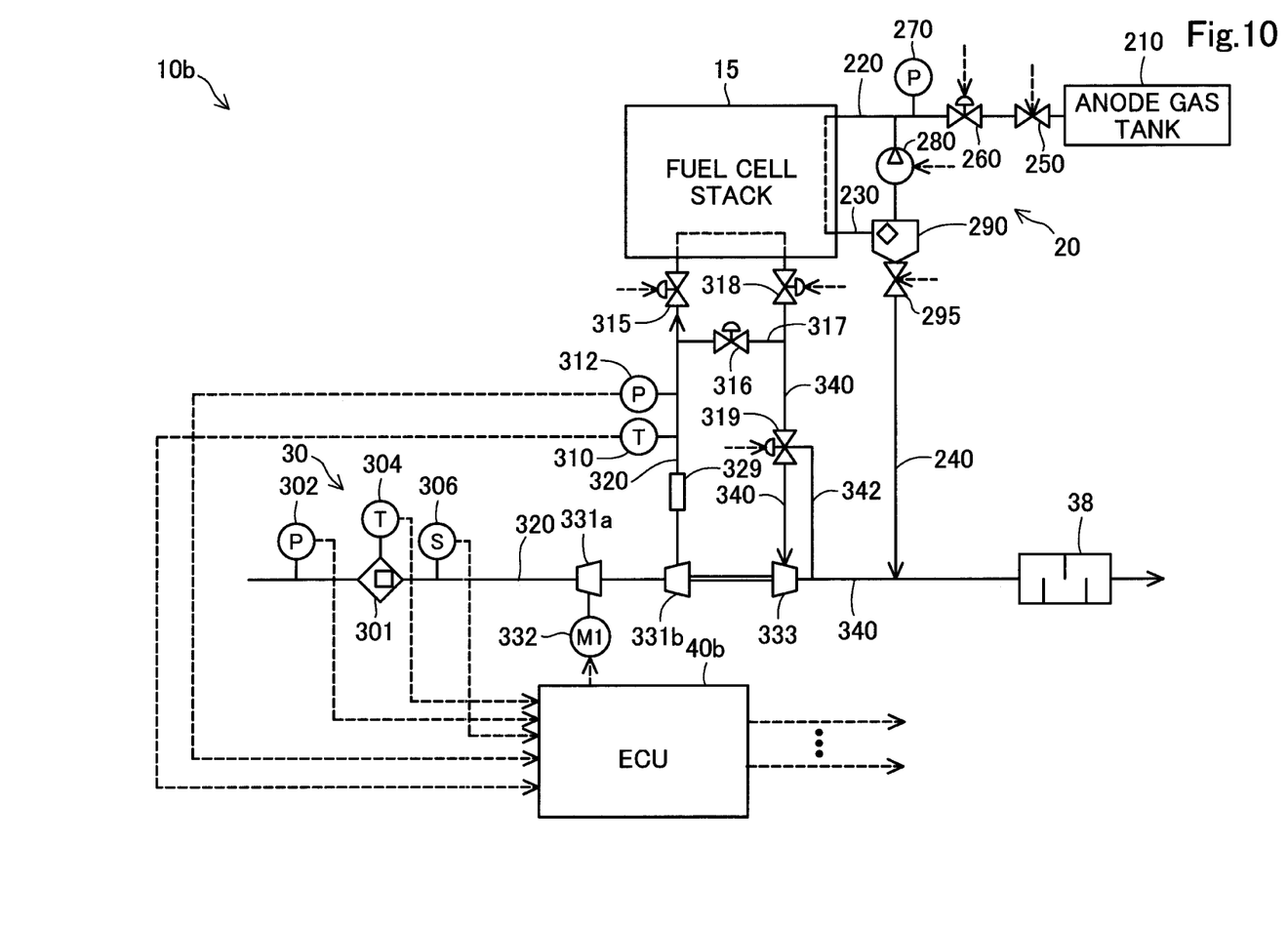
FIG. 10 is a schematic diagram illustrating a fuel cell system in a third embodiment of the present disclosure.

FIG. 10 is a schematic diagram illustrating a fuel cell system 10b in a third embodiment of the present disclosure. Differences from the fuel cell system 10 in the first embodiment shown in FIG. 1 are that the fuel cell system 10b in this embodiment includes a first compressor 331a driven by the motor M1 and a second compressor 331b on a downstream side of the first compressor 331a. In the description below, elements that are the same as those in the first embodiment are denoted with the same reference numerals as in the first embodiment, and the description thereof will be omitted. The first compressor 331a and the second compressor 331b are disposed on the cathode gas supply path 320.

The first compressor 331a is different from the compressor 331 of the first embodiment in that it is not connected to the turbine 333. The first compressor 331a includes the motor 332, and driving the motor 332 makes the first compressor 331a discharge the cathode gas downstream. The second compressor 331b is connected to the turbine 333. The second compressor 331b is driven by the power generated by revolution of the turbine 333 so as to discharge the cathode gas downstream.

An ECU 40b in the third embodiment executes the following processing to suppress the sharp drop of the cathode gas pressure in the fuel cell stack 15 in the same manner as the ECU 40 in the first embodiment. That is to say, in the case where the motor current value is changed in association with the change in the opening degree of the flow dividing valve 319, the ECU 40b shifts the timing of the change in the opening degree of the flow dividing valve 319 and the timing of the change in the motor current value by the predetermined time of delay td. More specifically, the ECU 40b executes the following processing when the motor current value of the motor 332 is raised in association with the increase in the flow rate ratio of the cathode exhaust gas flowing into the turbine bypass 342. That is to say, the ECU 40b executes the first control by which the motor current value is raised to boost the discharge pressure from the first compressor 331a and subsequently, the opening degree of the flow dividing valve 319 is changed so as to increase the flow rate ratio of the cathode exhaust gas flowing into the turbine bypass 342 (corresponding to the steps S14 and S16 in FIG. 4). In addition, the ECU 40b executes the following second control when the motor current value is lowered in association with a reduction in the flow rate ratio of the cathode exhaust gas flowing into the turbine bypass 342. That is to say, the ECU 40b executes the second control by which the flow rate ratio of the cathode exhaust gas flowing into the turbine bypass 342 is reduced and subsequently, the value of the current to be supplied to the motor 332 is lowered so as to lower the discharge pressure from the first compressor 331a (corresponding to the steps S14a and S16a in FIG. 9). The third embodiment can provide the same advantageous effects as those of the first embodiment. For example, the sharp drop of the cathode gas pressure in the fuel cell stack 15 can be suppressed without using a variable guide blade, and thus the power generation amount by the fuel cell stack 15 can be less likely to fall below the required power generation amount.

D. Alternative Embodiments

D-1. Alternative Embodiment 1

According to the foregoing embodiments, the poppet valve is used for the flow dividing valve 319; however, other kind of valves such as a butterfly valve may be used.

D-2. Alternative Embodiment 2

In the aforementioned third embodiment, the processing shown in FIG. 9 executed by the ECU 40a of the second embodiment may be further executed.

D-3. Alternative Embodiment 3

In the foregoing embodiments, the ECU 40, 40a and 40b execute both first control and second control; however, at least one of the first control and the second control may be executed. Even if at least one of the first control and the second control is executed, the sharp drop of the cathode gas pressure in the fuel cell stack 15 can be suppressed without using a variable guide blade, and thus the power generation amount by the fuel cell stack 15 can be less likely to fall below the required power generation amount.

The present disclosure is not limited to the aforementioned embodiments, but includes various modifications. For example, the aforementioned embodiments are described in detail to facilitate the understanding of the present disclosure and the present disclosure is not necessarily limited to the one including all of the described features. Moreover, part of features of a certain embodiment may be replaced with features of modifications, and features of modifications may be added to the features of a certain embodiment as well. Part of the features of each of the embodiments may be eliminated, or added and replaced with other features. The embodiments, modifications and modified examples may be combined. The present disclosure may be implemented by aspects described below.

(1) According to one aspect of the present disclosure, a fuel cell system is provided. This fuel cell system comprises a fuel cell stack, a supply path through which cathode gas to be supplied to the fuel cell stack flows, a discharge path which is disposed downstream of the fuel cell stack and through which cathode exhaust gas flows, a compressor disposed on the supply path and driven by a motor, a turbine disposed on the discharge path, connected to the compressor, and driven by the cathode exhaust gas, a bypass which is branched off from the discharge path at an upstream side of the turbine and through which the cathode exhaust gas is discharged without passing through the turbine, a flow dividing valve an opening degree of which is adjusted so as to adjust flow rate ratio of the cathode exhaust gas flowing into the turbine and flow rate ratio of the cathode exhaust gas flowing into the bypass, and a controller configured to control operation of the fuel cell system. The controller executes at least one of a first control and a second control. The first control is executed when a value of current to be supplied to the motor is raised in association with an increase in the flow rate ratio of the cathode exhaust gas flowing into the bypass, the first control is executed by which the value of the current is raised to boost discharge pressure from the compressor and subsequently, the opening degree of the flow dividing valve is changed so as to increase the flow rate ratio of the cathode exhaust gas flowing into the bypass. The second control is executed when the value of the current is lowered in association with a reduction in the flow rate ratio of the cathode exhaust gas flowing into the bypass, the second control is executed by which the opening degree of the flow dividing valve is changed so as to reduce the flow rate ratio of the cathode exhaust gas flowing into the bypass and subsequently, the value of the current is lowered so as to lower the discharge pressure from the compressor. According to this aspect, the value of the current to be supplied to the motor is raised to boost discharge pressure from the compressor and subsequently, the flow rate ratio of the cathode exhaust gas flowing into the bypass is increased in the first control. Therefore, the sharp drop of the cathode gas pressure in the fuel cell stack can be suppressed. As a result, the power generation amount by the fuel cell stack can be less likely to fall below the required power generation amount. Moreover, according to this aspect, the flow rate ratio of the cathode exhaust gas flowing into the bypass is reduced and subsequently, the value of the current to be supplied to the motor is lowered so as to lower the discharge pressure from the compressor in the second control. Therefore, the sharp drop of the cathode gas pressure in the fuel cell stack can be suppressed. As a result, the power generation amount by the fuel cell stack can be less likely to fall below the required power generation amount.

(2) According to another aspect of the present disclosure, a fuel cell system is provided. This fuel cell system comprises the fuel cell stack, the supply path through which the cathode gas to be supplied to the fuel cell stack flows, the discharge path which is disposed downstream of the fuel cell stack and through which the cathode exhaust gas flows, a first compressor disposed on the supply path and driven by the motor, a second compressor disposed downstream of the first compressor on the supply path, the turbine disposed on the discharge path, connected to the second compressor, and driven by the cathode exhaust gas, the bypass which is branched off from the discharge path at the upstream side of the turbine and through which the cathode exhaust gas is discharged without passing through the turbine, the flow dividing valve the opening degree of which is adjusted so as to adjust the flow rate ratio of the cathode exhaust gas flowing into the turbine and flow rate ratio of the cathode exhaust gas flowing into the bypass, and a controller configured to control the operation of the fuel cell system. The controller executes at least one of the first control and the second control. The first control is executed when the value of the current to be supplied to the motor is raised in association with the increase in the flow rate ratio of the cathode exhaust gas flowing into the bypass, the first control is executed by which the value of the current is raised to boost the discharge pressure from the first compressor and subsequently, the opening degree of the flow dividing valve is changed so as to increase the flow rate ratio of the cathode exhaust gas flowing into the bypass. the first control is executed when the value of the current is lowered in association with the reduction in the flow rate ratio of the cathode exhaust gas flowing into the bypass, the second control is executed by which the opening degree of the flow dividing valve is changed so as to reduce the flow rate ratio of the cathode exhaust gas flowing into the bypass and subsequently, the value of the current is lowered so as to lower the discharge pressure from the first compressor. According to this aspect, the value of the current to be supplied to the motor is raised to boost the discharge pressure from the first compressor and subsequently, the flow rate ratio of the cathode exhaust gas flowing into the bypass is increased in the first control. Therefore, the sharp drop of the cathode gas pressure in the fuel cell stack can be suppressed. As a result, the power generation amount by the fuel cell stack can be less likely to fall below the required power generation amount. Moreover, according to this aspect, the flow rate ratio of the cathode exhaust gas flowing into the bypass is reduced and subsequently, the value of the current to be supplied to the motor is lowered so as to lower the discharge pressure from the first compressor in the second control. Therefore, the sharp drop of the cathode gas pressure in the fuel cell stack can be suppressed. As a result, the power generation amount by the fuel cell stack can be less likely to fall below the required power generation amount.

(3) In addition to the foregoing aspects, the fuel cell system may further comprise a secondary battery. When the secondary battery is fully charged, the controller may control the opening degree of the flow dividing valve to let all the cathode exhaust gas flow in the bypass. According to this aspect, when the secondary battery is fully charged, no cathode exhaust gas is supplied to a side of the turbine. Thus, the power consumption of the compressor can be increased. Consequently, an overcharge of the secondary battery can be suppressed, which can reduce a probability of deterioration of the secondary battery.

What is claimed is:

1. A fuel cell system comprising:
   a fuel cell stack;
   a supply path through which cathode gas to be supplied to the fuel cell stack is configured to flow;
   a discharge path which is disposed downstream of the fuel cell stack and through which cathode exhaust gas is configured to flow;
   a compressor disposed on the supply path and driven by a motor;
   a turbine disposed on the discharge path, the turbine connected to the compressor, and configured to be driven by the cathode exhaust gas;
   a bypass which is branched off from the discharge path at an upstream side of the turbine and through which the cathode exhaust gas is configured to be discharged without passing through the turbine;
   a flow dividing valve having an opening degree which is adjustable to adjust flow rate ratios of the cathode exhaust gas flowing into the turbine and the bypass; and
   a controller programmed to control operation of the fuel cell system, the controller being programmed to execute at least one of a first control and a second control,
   wherein the first control is executed when a value of current to be supplied to the motor is raised in association with an increase in flow rate ratio of the cathode exhaust gas flowing into the bypass, the first control comprises raising the value of the current to boost discharge pressure from the compressor and subsequently, changing the opening degree of the flow dividing valve to increase the flow rate ratio of the cathode exhaust gas flowing into the bypass,
   wherein the second control is executed when the value of the current is lowered in association with a reduction in the flow rate ratio of the cathode exhaust gas flowing into the bypass, the second control comprises changing the opening degree of the flow dividing valve so as to reduce the flow rate ratio of the cathode exhaust gas flowing into the bypass and subsequently, lowering the value of the current to lower the discharge pressure from the compressor,
   wherein the first control further comprises, after transmitting an instruction to raise the value of current to be supplied to the motor, transmitting an instruction to change the opening degree of the flow dividing valve after a predetermined time of delay,
   wherein the second control further comprises, after transmitting an instruction to change the opening degree the flow dividing valve, transmitting an instruction to lower the value of the current to be supplied to the motor after the predetermined time of delay, and
   wherein the predetermined time of delay is set for a time period that will restrain a cathode gas pressure in the fuel cell stack from dropping below a pressure necessary for a required power generation amount determined by the controller.

2. A fuel cell system comprising:
   a fuel cell stack;

a supply path through which cathode gas to be supplied to the fuel cell stack is configured to flow;

a discharge path which is disposed downstream of the fuel cell stack and through which cathode exhaust gas is configured to flow;

a first compressor disposed on the supply path and driven by a motor;

a second compressor disposed downstream of the first compressor on the supply path;

a turbine disposed on the discharge path, the turbine connected to the second compressor, and configured to be driven by the cathode exhaust gas;

a bypass which is branched off from the discharge path at an upstream side of the turbine and through which the cathode exhaust gas is configured to be discharged without passing through the turbine;

a flow dividing valve having an opening degree which is adjustable to adjust flow rate ratios of the cathode exhaust gas flowing into the turbine and the bypass;

a controller programmed to control operation of the fuel cell system, the controller being programmed to execute at least one of a first control and a second control, wherein the first control is executed when a value of current to be supplied to the motor is raised in association with an increase in flow rate ratio of the cathode exhaust gas flowing into the bypass, the first control comprises raising the value of the current to boost discharge pressure from the first compressor and subsequently, changing the opening degree of the flow dividing valve to increase the flow rate ratio of the cathode exhaust gas flowing into the bypass, and wherein the second control is executed when the value of current to be supplied to the motor is lowered in association with a reduction in the flow rate ratio of the cathode exhaust gas flowing into the bypass, the second control comprises changing the opening degree of the flow dividing valve to reduce the flow rate ratio of the cathode exhaust gas flowing into the bypass and subsequently, lowering the value of the current to lower the discharge pressure from the first compressor, wherein the first control further comprises, after transmitting an instruction to raise the value of current to be supplied to the motor, transmitting an instruction to change the opening degree of the flow dividing valve after a predetermined time of delay, wherein the second control further comprises, after transmitting an instruction to change the opening degree the flow dividing valve, transmitting an instruction to lower the value of the current to be supplied to the motor after the predetermined time of delay, and wherein the predetermined time of delay is set for a time period that will restrain a cathode gas pressure in the fuel cell stack from dropping below a pressure necessary for a required power generation amount determined by the controller.

3. The fuel cell system according to claim 1 further comprising:
   a secondary battery, wherein
   the controller is further programmed to control the opening degree of the flow dividing valve so as to let all the cathode exhaust gas flow into the bypass when the secondary battery is fully charged.

4. The fuel cell system according to claim 2 further comprising:
   a secondary battery, wherein
   the controller is further programmed to control the opening degree of the flow dividing valve so as to let all the cathode exhaust gas flow into the bypass when the secondary battery is fully charged.

* * * * *